(12) United States Patent
Lacombe et al.

(10) Patent No.: US 12,115,486 B2
(45) Date of Patent: Oct. 15, 2024

(54) POROUS CERAMIC STRUCTURE FOR PART MADE OF CMC MATERIAL AND METHOD FOR OBTAINING SAME

(71) Applicant: SAFRAN CERAMICS, Le Haillan (FR)

(72) Inventors: Benjamin Lacombe, Moissy-Cramayel (FR); Gildas Garnier, Moissy-Cramayel (FR)

(73) Assignee: SAFRAN CERAMICS

( * ) Notice: Subject to any disclaimer, the term of this patent is extended or adjusted under 35 U.S.C. 154(b) by 319 days.

(21) Appl. No.: 17/618,214

(22) PCT Filed: Jun. 30, 2020

(86) PCT No.: PCT/FR2020/051144
§ 371 (c)(1),
(2) Date: Dec. 10, 2021

(87) PCT Pub. No.: WO2021/005285
PCT Pub. Date: Jan. 14, 2021

(65) Prior Publication Data
US 2022/0250992 A1    Aug. 11, 2022

(30) Foreign Application Priority Data

Jul. 10, 2019   (FR) .................................. 1907733

(51) Int. Cl.
*B01D 46/24* (2006.01)
*B28B 1/00* (2006.01)
(Continued)

(52) U.S. Cl.
CPC ... *B01D 46/24491* (2021.08); *B01D 46/2429* (2013.01); *B01D 46/24492* (2021.08);
(Continued)

(58) Field of Classification Search
CPC .. B01D 46/24491; B33Y 80/00; B33Y 10/00; C04B 35/62884; C04B 35/657;
(Continued)

(56) References Cited

U.S. PATENT DOCUMENTS

2020/0181029 A1    6/2020   Clerambourg et al.
2020/0392046 A1*  12/2020   David .................. C04B 35/573

FOREIGN PATENT DOCUMENTS

| CN | 103751852 B | 4/2014 |
| CN | 109415269 A | 3/2019 |
| WO | WO 2019/106282 A1 | 6/2019 |

OTHER PUBLICATIONS

International Search Report as issued in International Patent Application No. PCT/FR2020/051144, dated Aug. 18, 2020.
(Continued)

*Primary Examiner* — Michael Zhang
(74) *Attorney, Agent, or Firm* — Pillsbury Winthrop Shaw Pittman LLP (57) ABSTRACT

A porous ceramic structure intended to form the reinforcement of a ceramic matrix composite component, the structure having a connected porosity delimited by an internal surface which includes a plurality of first points, each first point being associated with a second point aligned with this first point along a normal to the internal surface taken at the first point, the structure being divisible into a plurality of unit volumes of a size less than or equal to 5 mm3 in each of which: a characteristic pore length, corresponding to the maximum of the distance separating each first point from its associated second point, is less than or equal to 0.5 mm; and a porosity ratio is greater than or equal to 50%.

11 Claims, 6 Drawing Sheets

(51) Int. Cl.
*B33Y 10/00* (2015.01)
*B33Y 80/00* (2015.01)
*C04B 35/628* (2006.01)
*C04B 35/657* (2006.01)
*C04B 35/78* (2006.01)
*C04B 38/00* (2006.01)

(52) U.S. Cl.
CPC ..... *B01D 46/2455* (2013.01); *B01D 46/2482* (2021.08); *B01D 46/2484* (2021.08); *B33Y 80/00* (2014.12); *C04B 35/62884* (2013.01); *C04B 35/657* (2013.01); *C04B 35/78* (2013.01); *C04B 38/0051* (2013.01); *C04B 38/0074* (2013.01); *B28B 1/001* (2013.01); *B33Y 10/00* (2014.12); *C04B 2235/3826* (2013.01); *C04B 2235/422* (2013.01); *C04B 2235/52* (2013.01)

(58) Field of Classification Search
CPC . C04B 35/78; C04B 38/0051; C04B 38/0074; C04B 2235/3826; C04B 2235/422; C04B 2235/52; C04B 38/0022; C04B 35/565
See application file for complete search history.

(56) References Cited

OTHER PUBLICATIONS

Colombo, P., et al., "Additive manufacturing techniques for fabricating complex ceramics components from preceramic polymers," American Ceramic Society Bulletin, vol. 96, No. 3, Apr. 2017, pp. 16-23.

Maurath, J., et al., "3D-printing of open-porous cellular ceramics with high specific strength," Journal of the European Ceramic Society, vol. 37, No. 15, Jun. 2017, pp. 4833-4842.

Zocca, A., et al., "SiOC ceramics with ordered porosity by 3D-printing of a preceramic polymer," Journal of Materials Research, vol. 28, No. 17, May 2013, pp. 2243-2252.

* cited by examiner

POROUS CERAMIC STRUCTURE FOR PART MADE OF CMC MATERIAL AND METHOD FOR OBTAINING SAME

CROSS-REFERENCE TO RELATED APPLICATIONS

This application is the U.S. National Stage of PCT/FR2020/051144, filed Jun. 30, 2020, which in turn claims priority to French patent application number 1907733 filed Jul. 10, 2019. The content of these applications are incorporated herein by reference in their entireties.

TECHNICAL FIELD

The invention relates to the field of reinforcements for ceramic matrix composite components and to processes for manufacturing such components. More particularly, the invention relates to a porous structure intended to form a reinforcement for a ceramic matrix composite component.

PRIOR ART

Ceramic matrix composites (CMC), known for their good mechanical properties that make them suitable for structural elements and for maintaining these properties at high temperatures, are a viable alternative to conventional metal components. They have lower mass and better temperature resistance than their metal counterparts, making them the components of choice to address the issues of increasing efficiency and reducing pollutant emissions from aircraft engines.

CMC components may comprise a generally continuous fiber reinforcement in the form of a woven textile, which is densified by a ceramic matrix. The fiber reinforcement thus comprises continuous long fibers, the orientation of which may be adapted to the main directions of stress on the component during use. The preform intended to form the fiber reinforcement is woven from the continuous fibers to the dimensions of the component (for example by two-dimensional or three-dimensional weaving), using a suitable loom. The weaving step is a time-consuming and expensive process. Then, the woven blank has to be shaped, for example by means of a shaper, and/or the blank has to be consolidated before densification, which further increases the number of steps to be carried out and thus the costs. The latter steps also lead to variations in the repeatability of the CMC component manufacturing process.

There is therefore a need for a ceramic matrix composite component manufacturing process that is easier to implement and less costly for manufacturing CMC components.

DISCLOSURE OF THE INVENTION

To this end, according to a first aspect, the invention proposes a porous ceramic structure intended to form the reinforcement of a ceramic matrix composite component, the structure having a connected porosity delimited by an internal surface which comprises a plurality of first points, each first point being associated with a second point aligned with this first point along a normal to the internal surface taken at the first point, the structure being divisible into a plurality of unit volumes of a size less than or equal to 5 $mm^3$ in each of which:

a characteristic pore length, corresponding to the maximum of the distance separating each first point from its associated second point, is less than or equal to 0.5 mm; and a porosity ratio is greater than or equal to 50%.

The porous structure according to the invention is a structure that may be distinguished from a fiber reinforcement conventionally used to manufacture a CMC component. The function of the reinforcement in a component made of CMC may be seen as being to form a network of pores small enough to avoid the Weibull statistic which governs the brittleness of solid ceramics. In particular, this statistic teaches that the brittleness (or probability of failure) of a solid ceramic is proportional to its size. With the porous structure according to the invention, a reinforcement may be provided that is particularly suitable for obtaining a CMC component with properties that vary little in the component, and a connected porosity defined by a maximum characteristic pore length that ensures greater resistance of the material to failure, i.e., reduces the brittleness of the material.

The characteristic pore length is a characteristic parameter of the pore size in the porous structure. As mentioned above, limiting the pore size increases the resistance of the CMC component.

Failure probability simulations show that going from a solid ceramic of several cubic millimeters to a CMC component having a connected porosity structure as a reinforcement with a porosity higher than 50% and where the pores are characterized by a characteristic length less than or equal to 0.5 mm increases the resistance of the component by a factor of at least two.

The divisibility of the porous structure into a plurality of unit volumes having well-defined properties, in particular concerning the characteristic pore length and its porosity, is not possible with a conventional woven fiber reinforcement. Such divisibility ensures a certain homogeneity of the porous structure which is advantageous within a CMC component.

It is no longer necessary to use a graphite conformer since the porous structure according to the invention may be directly shaped to be directly densified. A porous structure according to the invention can advantageously be obtained by additive manufacturing, which gives the possibility of manufacturing a large variety of different porous structures depending on the application envisaged.

In an example embodiment, the structure may comprise a plurality of interconnected structural elements which define the connected porosity. "Connected" is understood to mean that they are joined or connected to each other at least in pairs. The structural elements may have various shapes, such as parallelepipeds, beams, spheres, ellipsoids, etc. The structural elements may be solid or hollow. The structural elements may further be arranged in a lattice.

In an example embodiment, in each unit volume, a surface bridging ratio corresponding to the ratio between the sum of the surfaces connecting two structural elements to each other and the sum of the free surfaces of the structural elements may be less than or equal to 15%. Preferably, this ratio may be less than 10%. This surface bridging ratio is characteristic of the fact that the structural elements, which together will constitute the reinforcement of a CMC component, are substantially connected to each other. This ratio also indicates the proportion of the reinforcement surface that will be "wetted" by the ceramic matrix in the CMC component. A surface bridging ratio of less than 15% reduces the force required for the reinforcement to break between two structural elements and allow them to slide relative to each other in response to high stress, rather than breaking apart. Energy is dissipated better by sliding between the structural elements than by breaking them. Finally, sliding between structural elements is preferable in the reinforcement of a CMC than brittle failure of the elements.

In an example embodiment, the structural elements may be beams. The beams may for example have a circular, elliptical, square or rectangular cross-section.

In an example embodiment, the beams may be arranged to form a 4D structure where the beams are oriented in four directions given by the diagonals of a cube. The beams may then form a lattice. Such a structure is advantageous for obtaining a CMC component that is robust and has isotropic properties.

In an example embodiment, the structure may be sintered, i.e., obtained by a step of sintering a ceramic powder, for example.

In an example embodiment, each unit volume may have a size less than or equal to 1 mm$^3$.

In an example embodiment, the characteristic length may be less than or equal to 0.2 mm.

In an example embodiment, the porosity ratio of each unit volume may be between 60% and 80%.

In an example embodiment, the standard deviation of a distribution of characteristic lengths of unit volumes in the structure may be less than 10% of a mean value of said distribution in the structure, and the standard deviation of a distribution of porosity ratios of unit volumes in the structure may be less than 10% of a mean value of said distribution in the structure. This feature ensures that the properties of the porous structure which are related to the mechanical strength of the CMC component (characteristic pore length and porosity) are homogeneous in the structure. Such homogeneity cannot, for example, be obtained with a woven fiber reinforcement.

According to a second aspect, the invention also relates to a process for manufacturing a porous structure such as that presented above, comprising the manufacture of the structure by additive manufacturing. "Additive manufacturing" is understood to mean any process in which a component is manufactured layer by layer from the deposition of a material in various forms (powdered, mixed with a binder, molten, etc.). In particular, the porous structure according to the invention may be obtained by a selective sintering process on a powder bed using an energy beam (laser or electrons), which is particularly suitable for the manufacture of ceramic components. It is also possible to use a process of the binder jetting type in which a binder is projected onto a layer of powdered material so as to selectively bond a portion of the grains forming the layer, this operation is repeated on several layers until a blank is obtained, then the whole is debonded and sintered. Alternatively, a wire deposition process may be used, in which a wire comprising a binder and the powder is deposited in a plurality of layers to form a blank, then the assembly is debonded and sintered. Other processes such as stereo lithography can also be used.

According to a second aspect, the invention further relates to a process for manufacturing a ceramic matrix composite component comprising a matrix-densified porous reinforcement, the process comprising manufacturing a porous structure by a process such as the one described above, and forming a ceramic matrix in the porosity of the porous structure.

In an example embodiment, the formation of the ceramic matrix may be achieved by chemical vapor infiltration (CVI).

In an example embodiment, the porous structure may comprise silicon carbide, and the formation of the ceramic matrix may comprise introducing a carbon powder and/or a silicon carbide powder into the porosity of the porous structure, and then infiltrating the porosity of the porous structure with silicon or a molten silicon compound (melt infiltration (MI) process). The introduction of the carbon powder and/or silicon carbide powder may be achieved by injecting a slurry comprising the suspended powder(s) into the porous structure.

In an example embodiment, the formation of the ceramic matrix may be achieved by injecting a matrix precursor polymer into the porosity of the porous structure and pyrolysis heat treatment to convert the precursor to the matrix.

DESCRIPTION OF THE EMBODIMENTS

Figure 1:
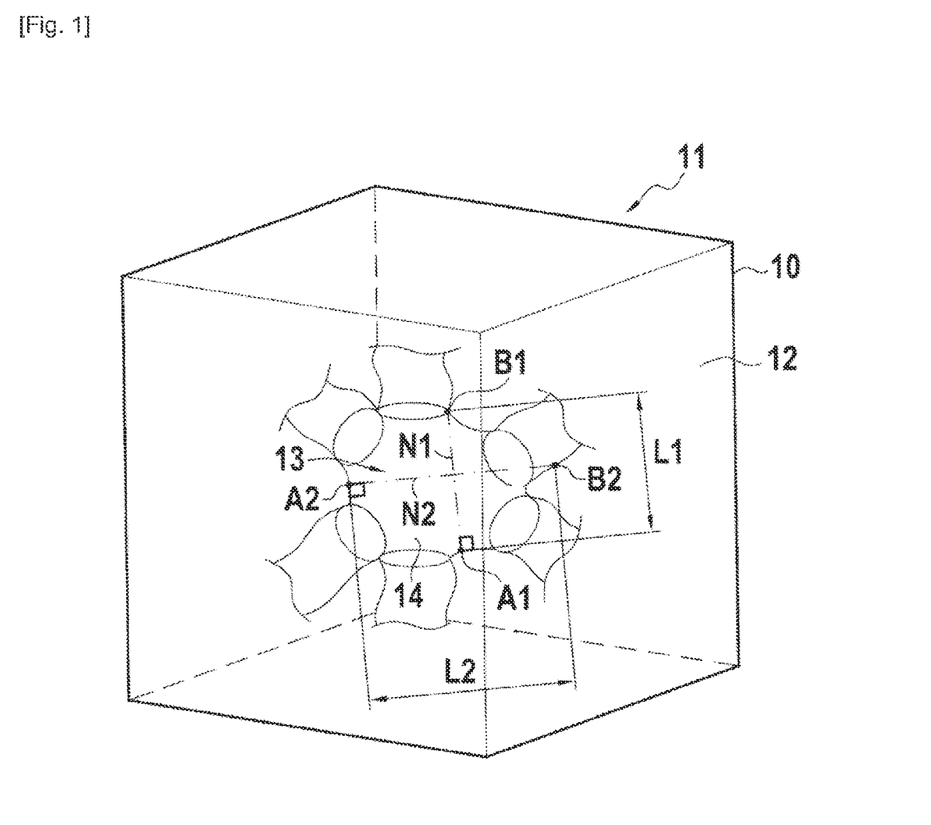
FIG. 1 is a schematic view of a porous structure to illustrate features of the invention.

FIG. 1 is a highly schematic representation of a unit volume 10 of a porous structure 11 comprising ceramic 12 and a set of pores connected inside the ceramic 12, of which only one pore 13 is shown for readability. The objective of FIG. 1 is to illustrate parameters of the invention.

The porosity within the ceramic is connected, i.e., there is a path from one pore to another of the structure without passing through ceramic. This porosity, and thus also the pore 13, is defined or delimited by an inner surface 14 of the ceramic 12. Since the porosity is connected, this inner surface 14 of the ceramic is continuous in the structure. The surface delimiting the pore 13 is thus a component of the inner surface and consists of a plurality of points.

A first point A1 on the inner surface delimiting the pore 13 is shown. The normal N1 to the inner surface 14 taken from the first point A1, and an associated second point B1 is also on the inner surface 14 and aligned with the first point A1 along the normal N1, is shown. A1 may be viewed as the orthogonal projection of B1 onto the internal surface 14. A distance L1 may be defined as the distance between the first point A1 and its associated second point B1. In other words, A1=p(B1) where p is the orthogonal projection.

Similarly, another first point A2 on the inner surface delimiting the pore 13 is shown. The normal N2 to the inner surface 14 taken from the first point A2, and an associated second point B2 which is also on the inner surface 14 and aligned with the first point A2 along the normal N2, is shown. A2 may be viewed as the orthogonal projection of B2 onto the inner surface 14. A length L2 may be defined as the distance between the first point A2 and its associated second point B2. In other words, A2=p(B2) where p is the orthogonal projection.

A characteristic pore length LC is then defined as the maximum of the distances Li where i corresponds to a pair of points (Ai; Bi) for any Ai of the internal surface 14 inside the unit volume. In other words, LC=max(Li).

This characteristic length LC may be determined, for example, by computer at the time the process of additive manufacturing of the structure is developed, or a posteriori, by imaging of sections, or by non-invasive imaging processes such as an X-ray scanner that allows the shape of porosities within a given volume to be obtained.

In a unit volume less than or equal to 5 mm$^3$ inside a porous structure according to the invention, the length LC is less than or equal to 0.5 mm, or preferentially less than or equal to 0.2 mm. The porosity inside a unit volume is, in turn, greater than or equal to 50%, and preferably comprised between 60% and 80%. These features are advantageous for subsequently using the structure as a reinforcement in a CMC component, as mentioned above.

Figure 2:
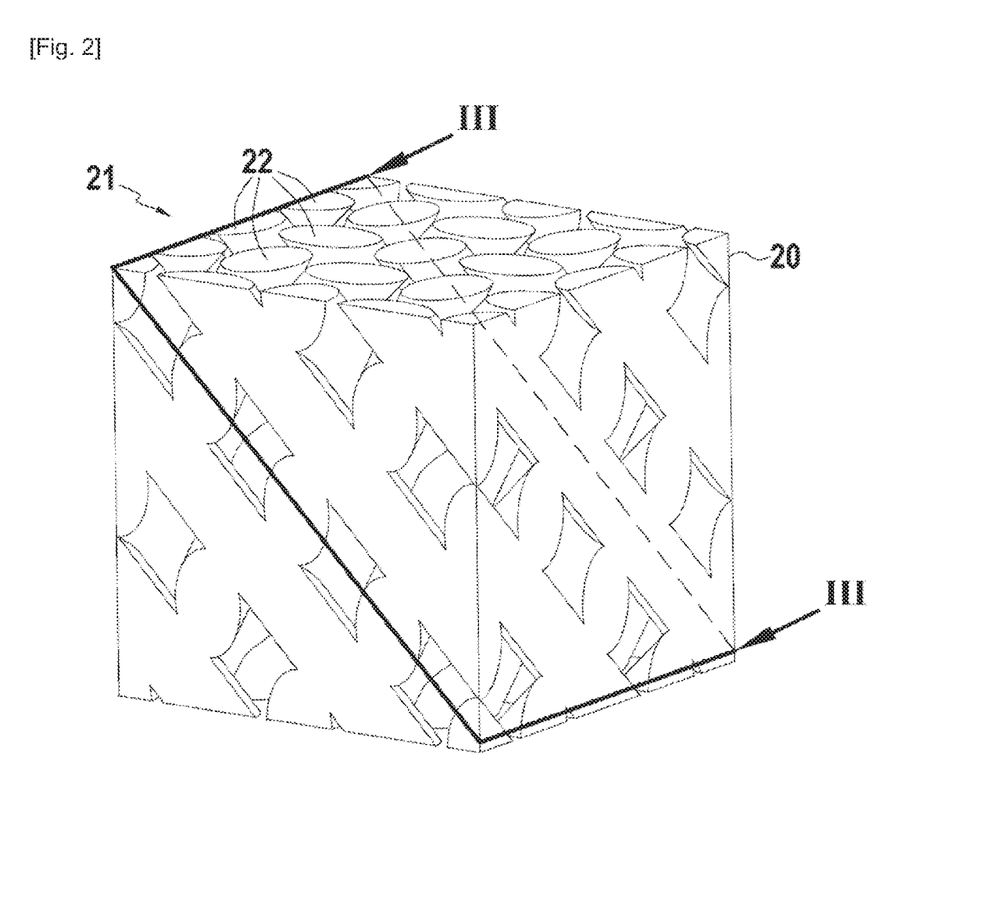
FIG. 2 shows a porous structure according to an advantageous embodiment of the invention.

FIG. 2 is a schematic representation of another unit volume 20 in a porous structure 21 according to an embodiment of the invention. Here, the porous structure 21 comprises a plurality of structural elements in the form of interconnected ceramic beams 22 arranged to form a 4D structure where the beams are oriented along four directions given by the diagonals of a cube.

In this example, the beams have a circular cross-section having a diameter preferably comprise between 0.1 and 0.2 mm.

Figure 3:
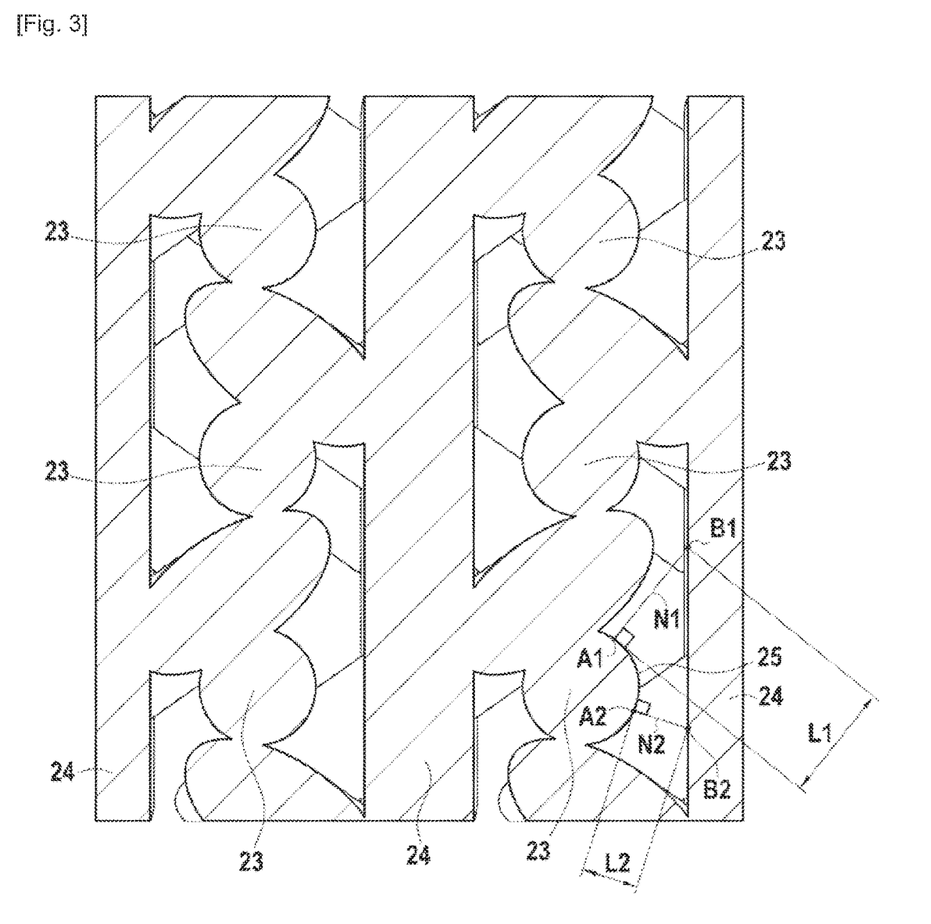
FIG. 3 is a cross-sectional view of the structure of FIG. 2 along the plane III.

FIG. 3 shows a cross-section along the plane III of FIG. 2. This cross-sectional plane is perpendicular to some beams which are identified by 23 and is parallel to other beams identified by 24. The porosity which is defined here by the beams of the structure can also be seen. Two first points A1 and A2 have been represented which are the respective orthogonal projections of B1 and B2 onto the internal surface 25 of the structure, corresponding to the surface of the beams. The normals N1 and N2 are in the plane of FIG. 3 by construction. The distances L1 and L2 separating the points A1-B1 and A2-B2, respectively, are also shown. Thus, for example, the characteristic length LC may be estimated from several sections along a beam in the unit volume 20 by looking for the largest length Li that will be characteristic of the pore size in the unit volume.

Figure 4:
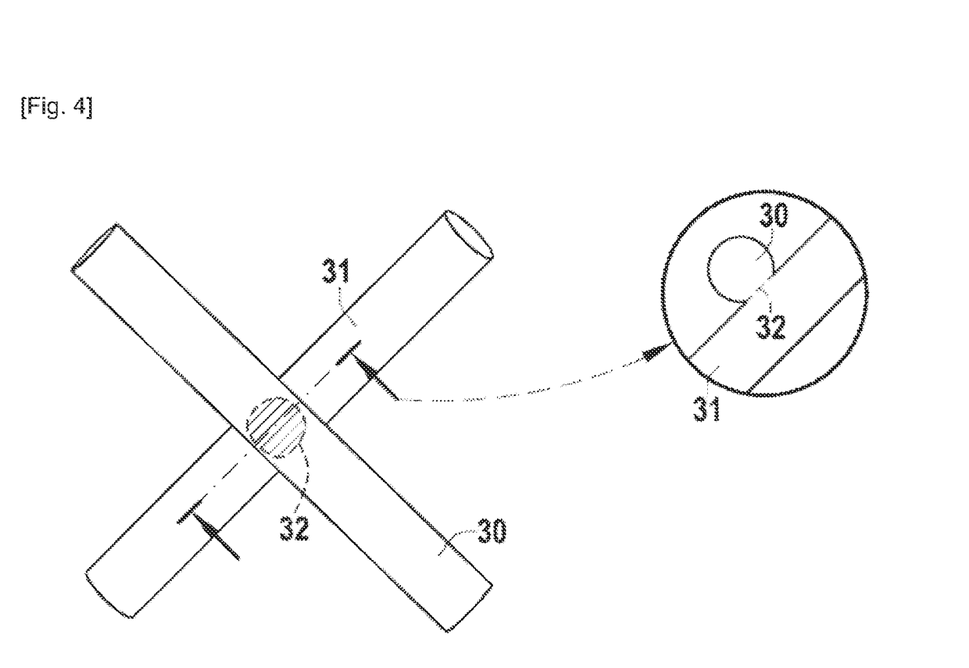
FIG. 4 shows two beams connected to each other.

FIG. 4 illustrates the feature according to which two beams are connected to each other. This figure shows a first beam 30 which is connected to a second beam 31. "Connected" is understood to mean that the beams are integral and share a contact surface 32, as illustrated. It is then possible to define, in a given volume, a surface bridging ratio between the beams which corresponds to the ratio between the sum of the contact surfaces connecting the beams to each other and the sum of the free external surfaces of the beams (which may therefore be in contact with a matrix in a CMC component). This ratio may, in a porous structure according to the invention, advantageously be less than 15%, or even 10%, so that there is rather a loosening of the reinforcement with respect to the matrix than a brittle failure of the reinforcement in the CMC component.

Figure 5:
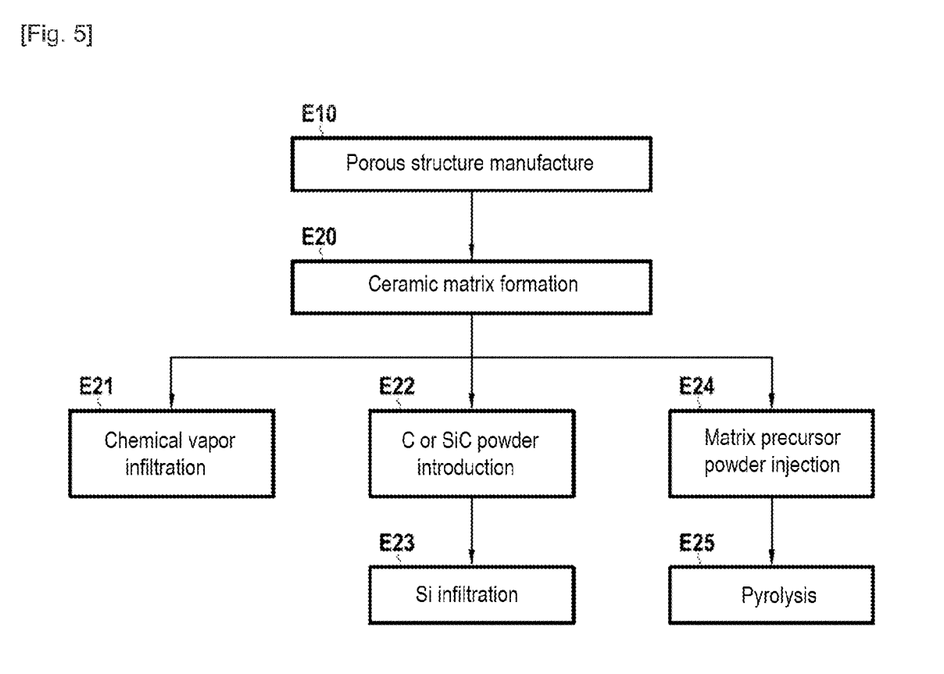
FIG. 5 is a flow chart illustrating the different steps of several variants of the process for manufacturing a CMC component according to the invention.

FIG. 5 shows, in the form of a single flow chart, various examples of a process for manufacturing a CMC component using a porous structure according to the invention.

In general, a process for manufacturing a CMC component according to the invention comprises at least a first step S1 of manufacturing a porous structure, according to the characteristics set out above and preferably by additive manufacturing, and a second step S2 of forming a ceramic matrix in the porosity of the porous structure.

Figure 6:
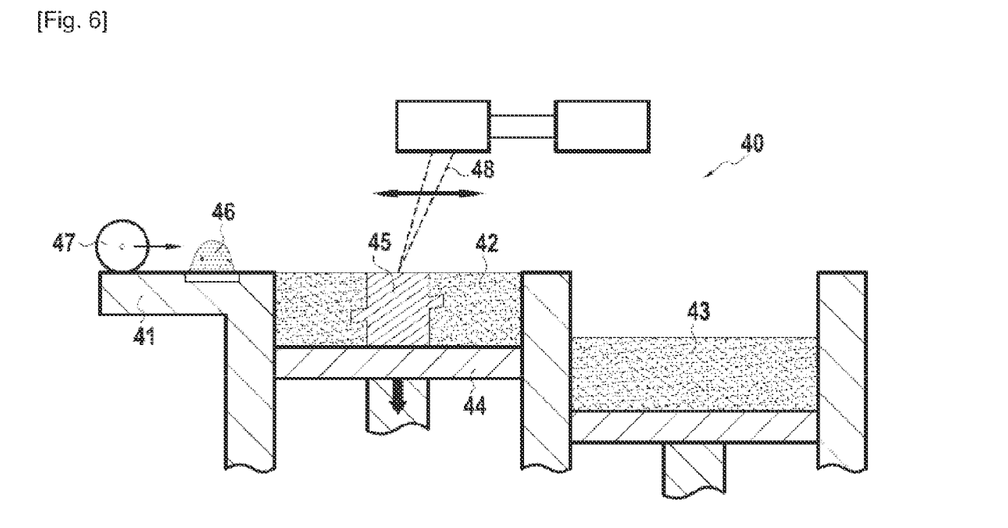
FIG. 6 shows an example of an additive manufacturing device by selective sintering on a powder bed.
Figure 7:
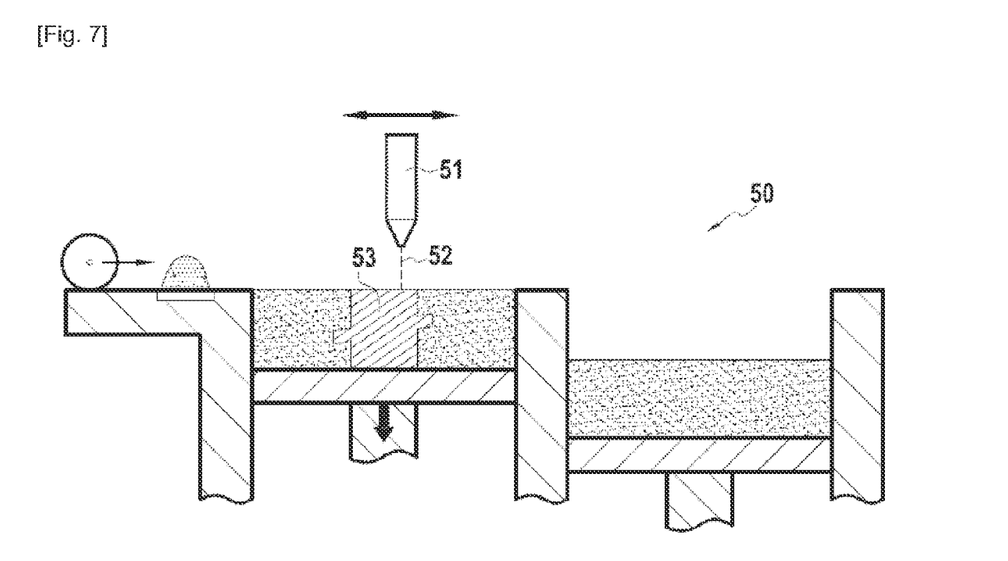
FIG. 7 shows an example of a binder spray additive manufacturing device.
Figure 8:
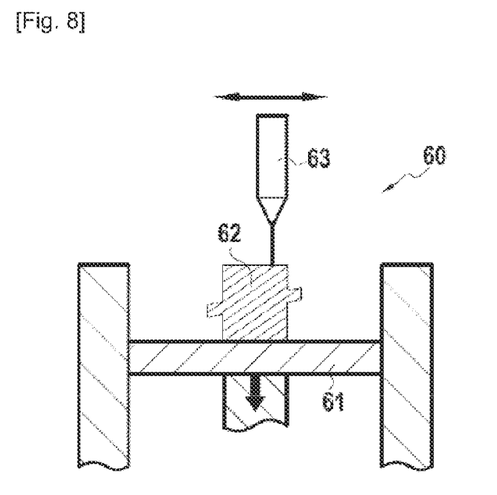
FIG. 8 shows an example of a wire deposition additive manufacturing device.

The first step S1 of manufacturing the porous structure can advantageously be performed by additive manufacturing. FIGS. 6, 7 and 8 are highly schematic representations of three devices that may be used to manufacture a porous structure in accordance with the invention.

FIG. 6 shows a device 40 for carrying out a selective sintering process on a powder bed. The device 40 firstly comprises a frame, one part of which is a fixed plate 41, another part of which comprises a manufacturing zone 42 located next to the fixed plate 41 in which the porous structure is to be manufactured, and a powder recovery tank 43 located next to the manufacturing zone 42 and opposite the fixed plate 41. The manufacturing zone 42 is provided with a mobile support 44 intended to receive powder and on which the porous structure 45 will be manufactured (here it is a turbine vane). The support 44 is in the form of a plate capable of moving vertically as the structure 45 is manufactured. Ceramic powder 46 is distributed throughout the manufacturing process and then spread, here with the aid of a roller 47, to form successive layers on the support 44. A laser (or electron) beam 48 is used to selectively sinter portions of a layer of ceramic powder that has just been spread.

FIG. 7 shows a device 50 for carrying out a binder jetting additive manufacturing process. The device 50 is similar to the previous one, except that this time a print head 51 is used which can spray a binder 52 onto a layer of powder that has just been spread to selectively bond powder grains together. The identical features between devices 40 and 50 will not be described again. In the device 50, a blank 53 of the porous structure is obtained which comprises a mixture of ceramic powder and shaped binder. The blank 53 must then be debonded (i.e., the binder present in the blank is removed) and sintered to obtain the porous structure.

FIG. 8 shows yet another device 60 for carrying out an additive manufacturing process by direct material deposition. This device 60 comprises a support 61 on which a blank 62 of the porous structure is fabricated, and which can here move vertically. The device 60 comprises a print head 63 which is supplied with a mixture of binder and ceramic powder, for example in the form of a solid wire. The blank 62 is produced layer by layer and the head 63 forms each layer by applying the binder/powder mixture which will have been previously heated. A blank 62 of the porous structure is obtained in the device 60, which comprises a mixture of ceramic powder and shaped binder. The blank 62 must then be debonded and sintered to obtain the porous structure.

The ceramic powder used may comprise, for example, silicon carbide, alumina, or other ceramics.

Other processes and devices than those described above are of course conceivable to obtain a porous structure according to the invention.

The following step S2 is to form a ceramic matrix in the porosity of the porous structure.

According to a first example, the matrix may be formed by chemical vapor infiltration CVI (step S21), i.e., the porosity of the porous structure is infiltrated with a gas phase matrix precursor which will be deposited therein, in a manner known per se.

According to a second example, in order to form the matrix, a carbon or silicon carbide powder can first be introduced into the porosity of the porous structure (step S22) by injecting, for example, a slurry comprising the suspended powder(s), and then the structure is infiltrated by silicon or a molten silicon compound (step S23). In this example, a CMC component with a silicon carbide matrix is obtained.

According to a third example, the matrix may be formed by injecting a matrix precursor polymer (step S24) into the porosity of the porous structure and then pyrolysis heat treatment (step S25) of the precursor to form the matrix.

It will be noted that the process may comprise, prior to forming the matrix in the porosity of the porous structure (step S20) a step of forming an embrittlement-release interphase on the porous structure, i.e., on the inner surface of the porous structure. The interphase may be monolayer or multilayer. The interphase may be deposited in a known manner by CVI. This interphase, which may comprise, for example, silicon carbide SiC, boron nitride BN, silicon-doped boron nitride BN(Si), or pyrocarbon PyC. The interphase has a function of embrittlement-release of the composite material which favors the deflection of possible cracks reaching the interphase after having propagated in the matrix, preventing or delaying the failure of the reinforcement obtained with the porous structure.

It may thus be even more advantageous to combine a porous structure according to the invention which comprises connected reinforcing elements with a surface bridging ratio of less than or equal to 15% and which are covered with an embrittlement-release interphase to further increase the mechanical strength of the resulting CMC component. Indeed, such a combination promotes loosening within the interphase rather than brittle failure of the structural elements.

Figure 9:
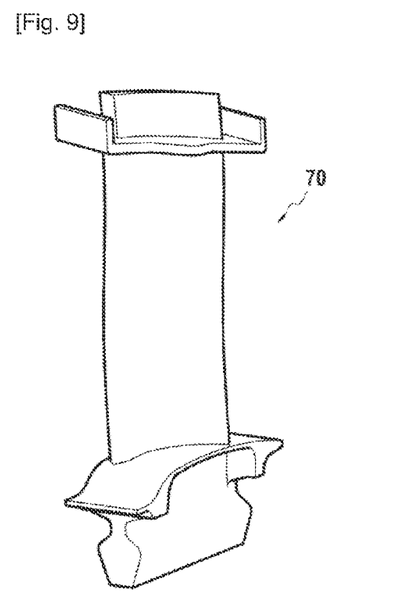
FIG. 9 shows an aircraft turbomachine vane.

Finally, it is particularly advantageous to manufacture aircraft turbomachine components by the processes described above, and in particular for use in hot parts of the turbomachine such as a turbine. For example, a turbine vane 70 such as that shown in FIG. 9 may be manufactured.

The invention claimed is:

1. A porous ceramic structure intended to form a reinforcement of a ceramic matrix composite component, the structure having a connected porosity delimited by an internal surface which comprises a plurality of first points each first point being associated with a second point aligned with said first point along a normal to the internal surface taken at the first point, the structure being divisible into a plurality of unit volumes of a size less than or equal to 5 mm$^3$ in each of which:
   a characteristic pore length, corresponding to a maximum of the distance separating each first point from its associated second point, is less than or equal to 0.5 mm; and
   a porosity ratio is greater than or equal to 50%; and
   comprising a plurality of interconnected structural elements which define the connected porosity, wherein in each unit volume a surface bridging ratio corresponding to a ratio between the sum of the surfaces connecting two structural elements to each other and the sum of the surfaces not connecting two structural elements to each other is less than or equal to 15%,
   wherein the structural elements are beams, and
   wherein the beams are oriented in four directions given by the diagonals of a cube.

2. The structure as claimed in claim 1, wherein the structure is sintered.

3. The structure as claimed in claim 1, wherein each unit volume has a size less than or equal to 1 mm$^3$.

4. The structure as claimed in claim 1, wherein the characteristic length is less than or equal to 0.2 mm.

5. The structure as claimed in claim 1, wherein the porosity ratio of each unit volume is comprised between 60% and 80%.

6. The structure as claimed in claim 1, wherein a standard deviation of a distribution of characteristic lengths of the unit volumes in the structure is less than 10% of a mean value of the distribution of characteristic lengths in the structure, and a standard deviation of a distribution of porosity ratios of unit volumes in the structure is less than 10% of a mean value of the distribution of porosity ratios in the structure.

7. A process for manufacturing a porous structure as claimed in claim 1, comprising manufacturing the structure by additive manufacturing.

8. A process for manufacturing a ceramic matrix composite component comprising a matrix-densified porous reinforcement, the process comprising manufacturing a porous structure by a process as claimed in claim 7 and forming a ceramic matrix in the porosity of the porous structure.

9. The process as claimed in claim 8, wherein the formation of the ceramic matrix is achieved by chemical vapor infiltration.

10. The process as claimed in claim 8, wherein the porous structure comprises silicon carbide, and the formation of the ceramic matrix comprises introducing a carbon powder and/or a silicon carbide powder into the porosity of the porous structure, and then infiltrating the porosity of the porous structure with silicon or a molten silicon compound.

11. The process as claimed in claim 8, wherein the formation of the ceramic matrix is achieved by injecting a matrix precursor polymer into the porosity of the porous structure and pyrolysis heat treatment to convert the precursor to the matrix.

\* \* \* \* \*